United States Patent [19]

Cowell et al.

[11] Patent Number: 5,128,988

[45] Date of Patent: Jul. 7, 1992

[54] TELEPHONE-SWITCHED NETWORK, AUTOMATIC METER-READING SYSTEM BASED UPON SERVICE ADDRESS

[75] Inventors: Thomas H. Cowell, Owosso, Mich.; Ronald S. Jahr, Naperville, Ill.

[73] Assignee: Ameritech Services, Inc., Schaumberg, Ill.

[21] Appl. No.: 495,789

[22] Filed: Mar. 19, 1990

[51] Int. Cl.$^5$ .................................. H04M 11/00
[52] U.S. Cl. .................................. 379/107; 379/106
[58] Field of Search .................. 379/107, 45, 37, 213, 379/201, 214; 340/870.02, 870.03

[56] References Cited

U.S. PATENT DOCUMENTS

| | | | |
|---|---|---|---|
| 4,241,237 | 12/1980 | Paraskevakos et al. | 179/2 AM |
| 4,817,131 | 3/1989 | Thornborough et al. | 379/107 |
| 4,823,343 | 4/1989 | Takahashi | 371/16 |
| 4,979,206 | 12/1990 | Padden et al. | 379/213 |

FOREIGN PATENT DOCUMENTS 974646  9/1975  Canada .

OTHER PUBLICATIONS

"Preliminary Specification for Automatic Telephone Number Administration ATNA", Base Ten Software, Inc. Trenton, N.J.; Feb. 1989.
"Ameritech Automatic Meter Reading Service Interface Specifications", Ameritech Services, Inc., Mar. 1989.
Reijne, "B.C. Tel Puts AVA on the Line", *Telephony*, Jan. 1989, pp. 25-26.
DeLong, Jr., "Making 911 Even Better", *Telephony*, Dec. 1987, pp. 60-63.
Mase, "'Your Number Please?' Gains a New Meaning," *Telephony*, pp. 94, 96.

Primary Examiner—James L. Dwyer
Assistant Examiner—Stella L. Woo
Attorney, Agent, or Firm—Milton S. Gerstein; Marvin N. Benn

[57] ABSTRACT

A computer-based system for correlating an address to the current switched network telephone number(s) assigned to and operational at the address. This Telephone Number Administration System is a data processing system which communicates with one or more other data processing systems using any of several types of telecommunication facilities. One of the data processing systems, the User system, transmits an address to the Telephone Number Administration System. The Telephone Number Administration System includes a data storage facility containing records which relate addresses and possibly other information to the current telephone number or numbers which are assigned to and operational at each address. Upon receiving an address from a User system, the Telephone Number Administration System performs a search of the records and identifies the telephone number(s) assigned to the address or addresses which most closely match the address received from the User system. The telephone number(s) obtained from this search may be transmitted by the Telephone Number Administration System back to the User system or to any other data processing systems which require the result of this correlation.

5 Claims, 5 Drawing Sheets

TELEPHONE-SWITCHED NETWORK, AUTOMATIC METER-READING SYSTEM BASED UPON SERVICE ADDRESS

BACKGROUND OF THE INVENTION

The present invention is directed to an automatic system for the remote-reading of utility meters, and the like, over the switched telephone-network. It is known to remotely-read utility meters, such as water, gas, and electric. There are various methods for achieving such remote-reading, such as by radio waves, CATV, power-transmission line accessing, and utilizing the switched telephone-network. The present invention is directed to an improved remote-reading system employing the switched telephone-system.

Presently-used remote-reading, switched telephone-systems are operated such that each utility requiring the remote-reading is equipped with a dedicated computer system, typically including a P.C., which contains a listing of all of its customers by account number, physical address, and telephone number. The utility's computer system communicates, by modem, with a telephone company's central-office, automated meter-reading system, which is a trunk-access controller (T.A.C.), that automatically routes an inputted telephone number from the utility system to the subscriber-line loop—or tip and ring lines—at the physical customer-site associated with the particular telephone number. The TAC is central office (CO) equipment that provides a means of controlling a CO-switch test-trunk by a remotely-located computer operated by utilities. The TAC receives the meter reading request from the remote computer, and uses the test-trunk to access the customer's telephone line whose meter is to be read. The test-trunk is used to establish access to the customer's exchange line without ringing or interfering with the customer's use of the line. The access-controller will monitor the line before access to determine if the line is in use; if it is, the telephone number will be repositioned to the end of the program. Also, the access-controller will monitor the line during the read sequence to determine if the end user requests dial tone; if the end user does, automatic meter-reading (A.M.R.) service will be terminated, and the end user will receive immediate dial tone. At that customer-site, there is provided an automatic "Meter Interface Unit" (M.I.U.) which, upon actuation by a signal sent thereto by the utility's computer system via the T.A.C., will "read" the current reading of the four dials, for example, of the meter, and will transmit such reading back to the utility's computer system by the switched telephone-network by means of the T.A.C. Each customer-premise is equipped with this Meter Interface Unit (MIU). The MIU is installed on the customer side of the protector or standard network interface (SNI), and is considered customer-premises equipment (CPE). The MIU is a compact communications device that is connected as a non-ringing extension on the customer's existing phone line. Typically, the MIU can read up to four meters and transmit the data over the exchange line. The MIU can be wired in tandem (up to four) to read 16 meters over one POTS line. At the request of the utility, the access controller sends a "wake-up" tone to the MIU using the test trunk of the CO switch. The MIU "wakes up", reads the ports associated with the meters, and sends the meter-reading data, with other identifying status data, transparently through the access controller to the utility. A meter-encoder is a device that is owned, installed and maintained by the utility. The meter-encoder is attached to electric, gas and water meters; it can be factory or field installed. The encoder remains dormant until activated by the MIU. When activated, the encoder takes a live read, and passes it to the data-collection center. An example of such a system is set forth and explained in depth in the publication entitled "Ameritech Automatic Meter Reading Services Interface Specifications", published by Ameritech Services, Inc., of Arlington Heights, Ill., which is incorporated by reference herein. This publication clearly sets forth the operations, protocol, and the format and control messages of the access and command messages between the utility's computer system and the telephone company's trunk-access controller, as well as between the utility's computer system and the information routed to it from each meter-interface unit at each customer-premise via the trunk-access controller. The AMR software loaded in the utility company's computer receives the data, checks the validity and enters it in the data base for that particular customer. The reading process from the time the TAC receives the customer's telephone number until the data is returned to the utility's computer is approximately 8 to 12 seconds.

AMR service requires a meter equipped with an encoder and an MIU connected to the telephone line via RJII modular jack or the Standard Network Interface (SNI). The existing telephone circuit will provide line-power for the encoder plus provide access for the utility to read the meter.

A typical read-sequence is as follows:

1. Utility programs the utility computer to read 1,000 meters at midnight;
2. The utility computer calls the access controller at the telephone company's central office;
3. The access controller answers and receives a password from the utility computer and disconnects;
4. The access controller calls the computer at a programmed number (security);
5. The computer identifies the first number to be read; the access controller accesses the test-trunk and passes the number to be read;
6. The test-trunk verifies that the POTS is not being used, then accesses the line;
7. A tone is sent from the access controller to "wake up" the MIU;
8. The MIU accesses four ports and four readings are made; the data is distributed to the data collection center;
9. The next number is then read.

Local telephone companies and long distance carriers maintain one or more computer data-base systems which contain current information pertaining to their customers. These database systems are used to support directory-assistance services, emergency-telephone services (911), customer billing, internal-line assignment and maintenance services, etc. The information contained in these data-base systems can include the address at which telephone service is furnished, and the current, switched-network telephone number or numbers that are assigned to, and operational at, the service-address. By enabling access to, and searches of, these data bases by address, the present invention relieves the vendors of other telephone-based services, such as automatic meter-reading, energy-management, telemarketing, and the like, from the burden, cost, delay, and inaccuracies associated with maintaining separate. proprietary data bases for customer telephone numbers. Automatic Meter Reading (AMR) allows a utility to electronically enter an end user's premises to retrieve The current consumption data, without disturbing the end user. The utility can access the telephone-company's central office for interrogation of the end user's utility meters; this action is completed without ringing the phone.

SUMMARY OF THE INVENTION

It is the primary objective of the present invention to provide a means of correlating street addresses to the public switched telephone network number or numbers which are assigned to and operational at the addresses.

It is another objective of the present invention to provide a means of correlating street addresses combined with additional location information such as apartment suite, floor, building, locality, or other designators to the public switched telephone network number or numbers which are assigned to and operational at the combined addresses.

Toward these and other ends and objectives, the telephone number administration system includes a data processing system with a data base and an interface to telecommunication facilities which permit the telephone number administration system to receive inquiries from a user data processing system. Each inquiry received by the telephone number administration system from a user includes a street address or combined address. The data base of the telephone number administration system is comprised of records which are organized to permit the administration system to search the records for the address or addresses which most closely match the street address or combine address received from the user. The data base records also include the public switched network telephone number or numbers which are assigned to and operational at the matching address or addresses.

The telephone number administration system includes an interface to telecommunication facilities which permits the system to transmit the telephone number or numbers identified by the record search to another system or systems which are designated to receive the telephone number information.

BRIEF DESCRIPTION OF THE DRAWINGS

The invention will be more readily understood with reference to the accompanying drawing, wherein.

DETAILED DESCRIPTION OF THE INVENTION

Figure 1:
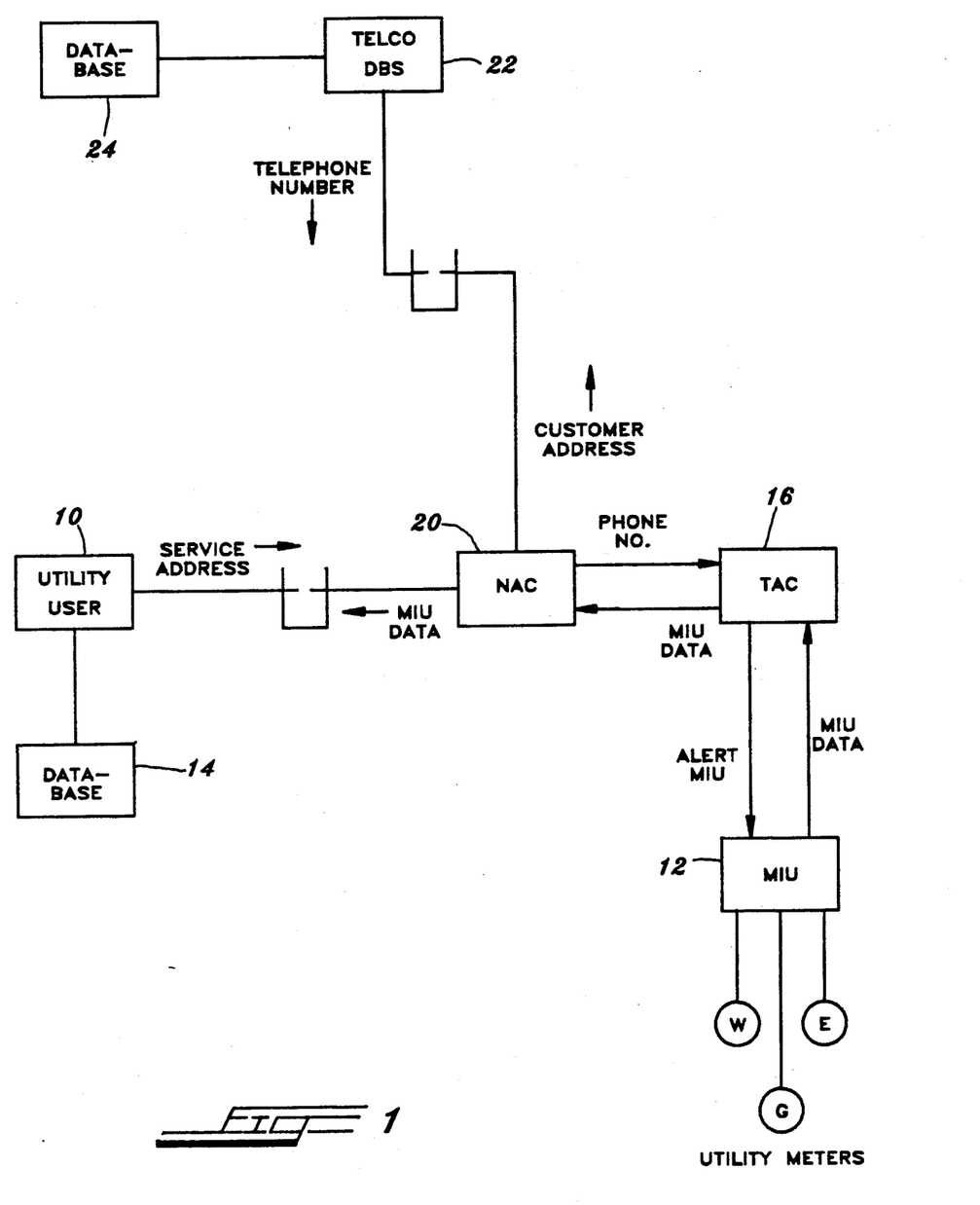
FIG. 1 is a block diagram of the automatic meter-reading system of the invention in which there is incorporated a telephone-number administration controller for accessing a telephone company's data base in order to convert a customer-premise-address input thereto to a telephone number for the respective address.

Referring to the drawings in greater detail, the automatic meter-reading system of the invention is shown generally in FIG. 1. The overall operating system includes a utility user 10, such as a water department, electric or gas utility company, and the like, who desires to read a meter or meters at a customer-premise or site via the switched telephone-network, whereby a meter-interface unit, or M.I.U., 12 provided at a customer-premises or site may be "read". The utility user 10 also has a data base 14 in which is stored customer account numbers, physical addresses of the customers, and may include the telephone numbers of the customers, and the like. The utility user 10 also has a dedicated computer system, such as a P.C., for communicating with the remainder of the system of the invention, by modem-transmission. A trunk-access controller, or T.A.C., 16 is also part of the overall system, which controller provides the switched connection between the utility user's computer system and each target meter-interface unit, or M.I.U., over the switched telephone-network. The above-described components of the system are presently used for the remote-reading of utility meters via the switched telephone-network, as set forth in the publication entitled "Ameritech Automatic Meter Reading Services Interface Specifications" published by Ameritech Services, Inc., cf Arlington Heights, Ill. As set forth above, the limitations of such prior-art system is the fact that up to 30% or more of telephone numbers change every year, so that a utility user remotely-reading the M.I.U.'s of its operations, will, on average, experience a 30% or more failure rate of automatic meter-reading via the switched telephone-network. The present invention has overcome this problem by accessing each M.I.U. of the utility customer's operations based on physical customer-address, rather than on telephone number, since the actual location of each M.I.U. does not change. Toward this end, the system of the present invention includes a number-administrator controller, or N.A.C., 20, which intercedes between the utility user's dedicated computer system and the trunk-access controller 16. The telephone-number administrator controller is coupled to a telephone-company data base 22, via modem- transmission, which data base includes a number of standard data files, such as data base file 24, which may be the "Directory-Assistance Service" data base, which not only has the telephone number of each telephone subscriber, but also the address associated with each one. Thus, according to the invention, a utility user 10, such as a gas company, will access a respective M.I.U. by inputting the service-address to the N.A.C. computer system, which, in turn, will communicate with the telephone company's data base 22, and extract therefrom the telephone number associated with the service-address input received from the utility user. Having determined the telephone number corresponding to the target service-address, the N.A.C. will then direct the trunk-access controller, or T.A.C., to the proper switching state, in order to connect the user system 10 to the target M.I.U., whereupon, the M.I.U. is interrogated in the conventional manner, and the information thereof sent back to the user system 10 through the N.A.C.

According to one embodiment of the invention, the utility user 10 will still generate and maintain its own data base files 14, with the customer account numbers, etc., and will interrogate the M.I.U.'s of its operations by service-address via the N.A.C., as described above. However, it is within the scope and purview of the invention to allow the utility company to eliminate such a dedicated data base, by relying solely in the system of the invention, and the number-administrator controller system thereof, thus considerably reducing overhead and variable costs, as well as providing a more efficient system. At present, the data base 14 of the utility user must not only contain information on the telephone numbers associated with the many M.I.U.'s in service, but must also contain switching information associated with the telephone number, such as pair-gain, which is necessary for the proper control and functioning of the trunk-access controller, or T.A.C. Pair-gains instruct the T.A.C. that the target telephone number is part of a "Subscriber-Line Carrier" system, or SLC, and such information must be passed on to the T.A.C. if the switched connection to the target M.I.U. is to be achieved. According to the present invention, such pair-gain information may be obtained from the very data base 24 of the telephone company from which the reverse look-up, or address-driven interrogation, was done through the N.A.C. Telephone companies presently have data bases that not only may correlate telephone numbers with street, or premise, addresses, but also contain all of the information required by the T.A.C. to complete the proper switched connection to the target telephone numbers. In the case where the data base 24 that is used is "Directory-Assistance Service", where no pair-gain information is provided, the N.A.C. itself will generate its own reference-table over time, after all of the M.I.U.'s of the utility user have been accessed once. That is, for each initial address input from the utility user, when the system of the invention is used for the first time, the N.A.C. will store in its own nonvolatile RAM, each service-address and the associated telephone number obtained from the data base 24 during the look-up process. When all of the M.I.U.'s of the utility user has been accessed the first time, all the necessary correlations between street address and telephone number will have been stored in the N.A.C.'s memory. Since the "Directory-Assistance Service" data base has no information on switching codes for the T.A.C., the N.A.C. will assume for each telephone number that it is not part of a "Subscriber-Line Carrier" system, or SLC. If the T.A.C. is not able to make the switched connection with the target M.I.U., then the N.A.C. will assume that the target telephone number is part of an SLC, and will then attempt to reach the target M.I.U. by providing the proper code to the T.A.C. indicative of a SLC system. If such is successful, then the N.A.C. will post a SLC flag in its reference-table for that particular service-address and associated telephone number, so that the next interrogation shall be achieved on the first attempt, all other factors being equal. In this manner, the need for the utility company to keep and maintain its own dedicated computer system and data base may be obviated. It is to be understood that the command codes for controlling the T.A.C. are conventional, as set forth in the above-cited publication.

In the embodiment shown in the drawings, the system of the invention has assumed that the utility user maintains, and will maintain, its own dedicated data base, although as set forth above, it is an objective of the present invention to allow for such utility data base 14 to be eliminated altogether. In this embodiment, there is the singular advantage of permitting the utility user's system 10 to operate in the conventional, prior-art manner, by directly communicating and controlling the T.A.C., in which case, the N.A.C. serves merely as a transparent conduit, or connector, between the user's system and the T.A.C. This may be advantageous during times when, for whatever reason, the telephone company's data base 24 cannot be accessed, or, in the case of a reference file having been generated by the N.A.C., as explained supra, when problems exist in the N.A.C. itself. Under these circumstances, the utility user's system will resort back to the prior-art method of direct switched connection to irs M.I.U.'s by sending the telephone numbers therefor, as opposed to the service-addresses. It is, of course, understood that the N.A.C. will still provide the proper channels of communication between the user's system and the T.A.C. Thus, the invention allows for a ready and sure back-up method utilizing the hitherto-conventional process.

In an alternative embodiment, telephone-company switching equipment may be arranged to permit non-ringing access to subscriber lines without requiring the presence of a T.A.C. in the central office. In this configuration, the N.A.C. 20 communicates directly with the telephone switching equipment, and transmits the subscriber-telephone number associated with an M.I.U. 12 to the switching equipment, rather than utilizing a test line required by a T.A.C. The switching equipment then establishes a connection between the N.A.C. and the requested subscriber-line without ringing the subscriber's telephone. Once the connection has been established, the N.A.C. completes the data acquisition from the M.I.U. in a manner similar to that followed by a T.A.C.

Figure 2:
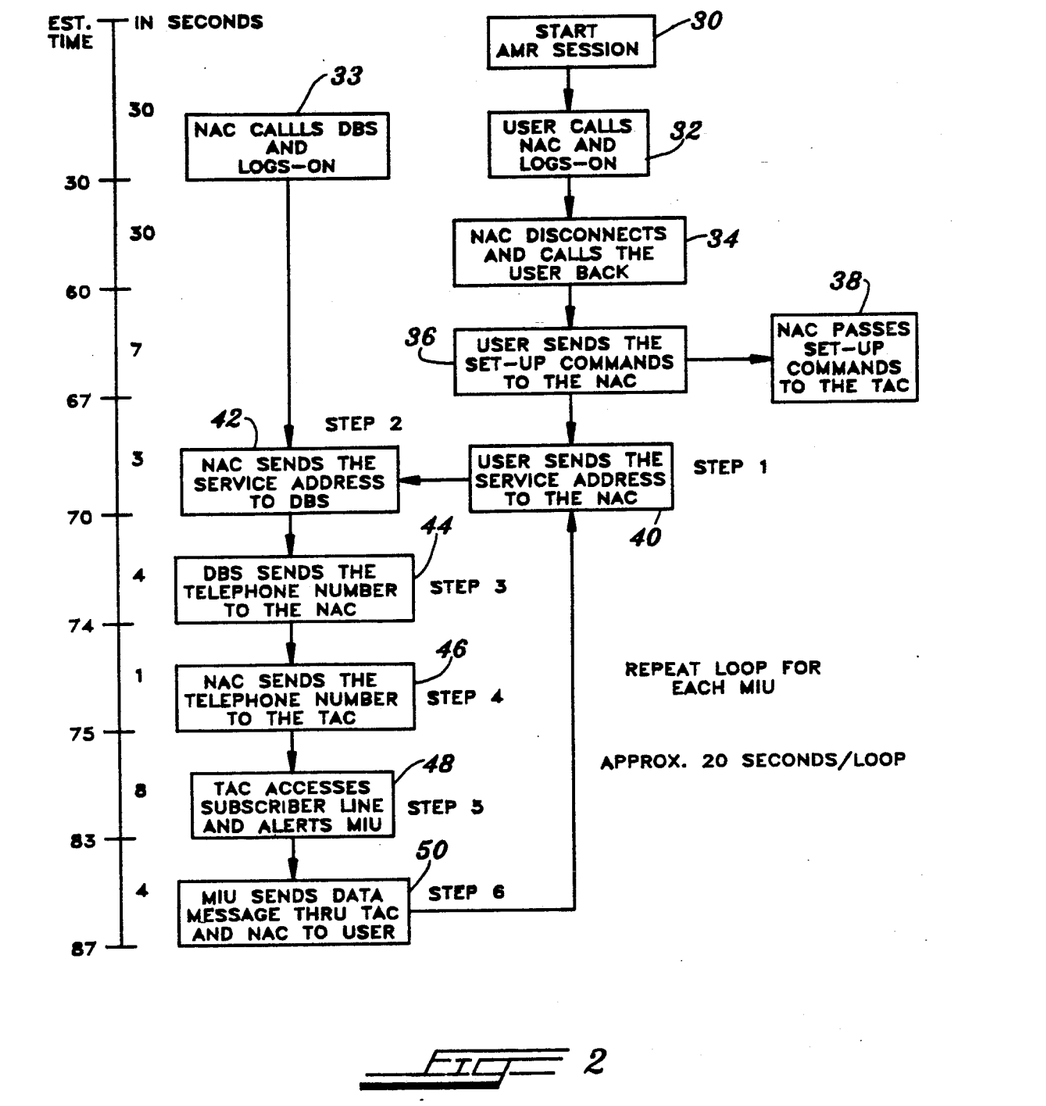
FIG. 2 is a flow chart showing the operation of the system of FIG. 1 from initial access by a utility company's system to the gathering of data from a meter via the meter-interface unit at the premises.

FIG. 2 shows in more detail the operation of the system of the invention. At the start of the automatic reading session (Block 30), the utility user's system will transmit a call via modem to the system N.A.C. in order to Log-on (Block 32). The N.A.C will then disconnect and call the user's system back (Block 34), for security purposes, and will also call the telephone company's data base and Log-on to it (Block 33). The user's system will then send the conventional set-up commands to the N.A.C., which, in turn, will send the commands to the T.A.C. (Blocks 36, 38). When this initiation-procedure has been completed, the user's system will send the first service-address whose M.I.U. is to be interrogated to the N.A.C. (Block 40), whereupon, the N.A.C. will send the service-address to the telephone company's data base (Block 42). A reverse-lookup is performed, and the data base will send the telephone number associated with that service-address to the N.A.C. (Block 44), which, in turn, sends the telephone number to the T A.C. (Block 46). The T.A.C. accesses the subscriber-line and causes the M.I.U. to be actuated (Block 48), which M.I.U. transmits the meter data-reading through the T.A.C. to the N.A.C., which sends it to the utility user's system (Block 50). The process is repeated until all of the service-address inputs have been completed. In the case where the N.A.C. of the system of the invention will generate its own reference-table, as described above, then the blocks 42 and 44 are performed only during the first, or initial, automatic meter-reading for the respective utility user. Thereafter, the N.A.C.'s own reference-table will generate the necessary telephone number and switching code for the T.A.C., as explained above In this type of system, the N.A.C. will communicate with the telephone company's data base only when a M.I.U. associated with a respective telephone number was not accessed. The N.A.C. will then access the telephone company's data base to see if the telephone number for that respective service-address has been changed since the last updating of the N.A.C. reference-table. If such a change did in fact occur, then the N.A.C. will update its reference-table, and retry the connection based thereon.

Figure 3:
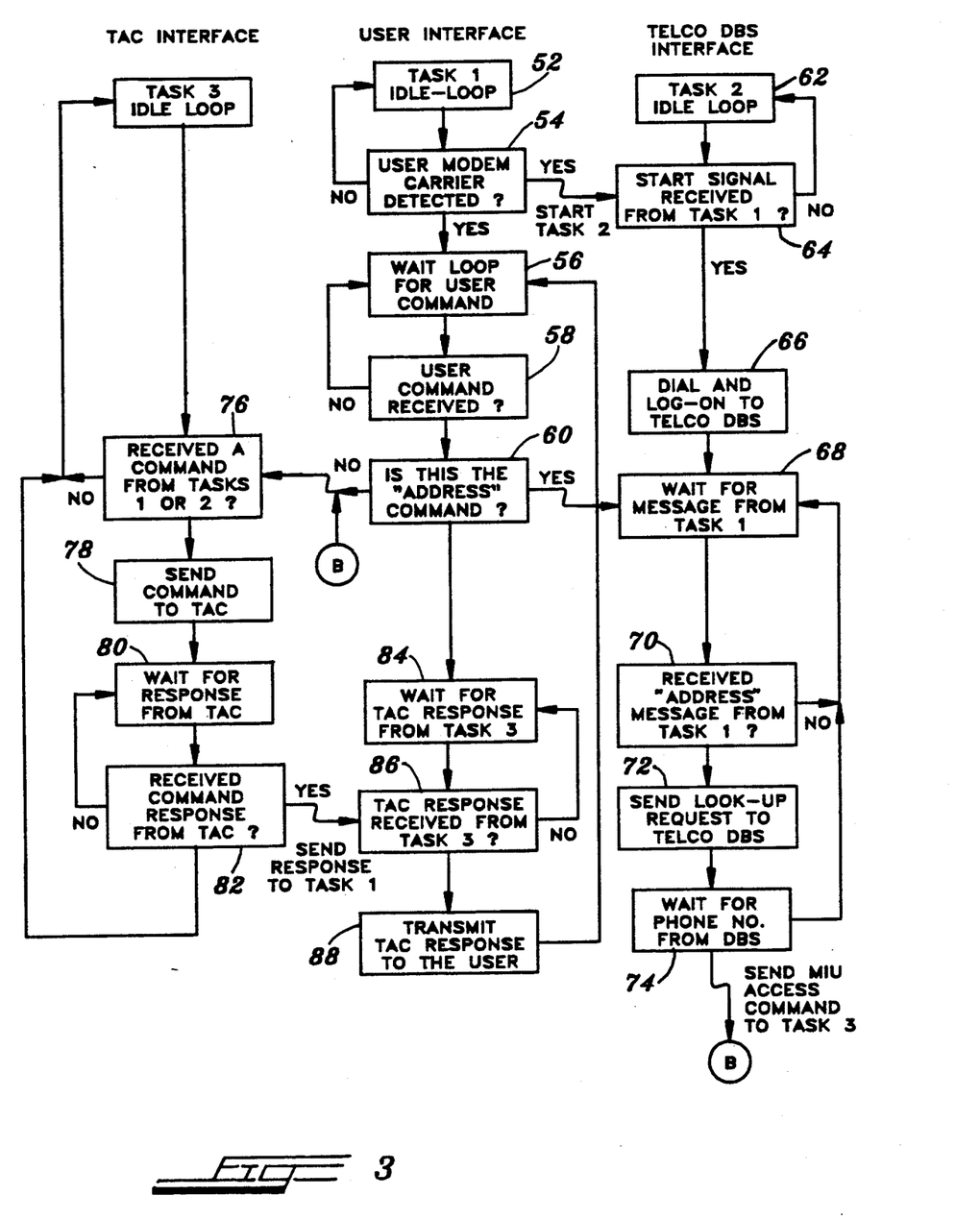
FIG. 3 is a flow chart of the application tasks performed by the telephone-number administration controller of the invention.

The number-administrator system (N.A.C.) of the invention performs three essential tasks, as shown in FIG. 3. The first task starts with Blocks 52-58, which includes Log-on, call-back, etc., with the utility user's system, as discussed previously. When a user command has been received (Block 58), the N.A.C. will determine if the command is a "service-address" command (Block 60), in which case the N.A.C. will route to the second, or intermediary, task performed thereby, which is the reverse look-up routine, for calling up the telephone number from the telephone company's data base, as set forth above. This second routine is indicated by Blocks 62 through 74, with Blocks 62-68 being initialization of modem-connection between the telephone company's data base and the N.A.C. When the "Service-Address" command has been received by the N.A.C. (Block 60), then it determines if the address message has been received (Blocks 68, 70), upon which, the look-up command to the telephone company's data base is initiated, with that telephone number being sent by the N.A.C. to the T.A.C. in carrying out the third task thereof (Blocks 76, 78). This third applications task will then wait for a response from the T.A.C., which response is the meter-reading information provided by the M.I.U. at the target site (Blocks 80, 82). This "reading" is then transmitted by the modem-connection to the utility user's system (Blocks 84-88), with the utility user's computer system storing such information for billing, etc. If the command from the utility user's computer system (Block 58) is not a service-address command, but rather the conventional telephone-number command, then the intermediate, or second, task (Blocks 62-74) is not necessary, and the N.A.C. will simply act as a transparent conduit to the T.A.C. (Blocks 60, 76, 78), completely bypassing the second, or intermediate, steps shown in Blocks 68-74.

As explained above, this above-described procedure will hold for all message-commands from the utility user's system if the N.A.C. does not generate and store in its updated reference-table If, however, it will generate such a table, then this description will hold for the first complete accessing cycle, with the second, or intermediate, routine being performed only when the T.A.C. was not able to make the switched connection to the respective M.I.U. (Blocks 76-82)—assuming a "Service-address" command was sent by the utility user's system (Block 60)—which is determined by a lack of response from the T.A.C. (Block 82) after a preset time period has elapsed, which is approximately 4 seconds, or less. Under this circumstance, the N.A.C. will automatically route to the second task (Blocks 60 and 68-74), with the service-address input thereto being matched with a new, changed telephone number for that service-address, if it exists, and the reference-table of the N.A.C. updated accordingly. If the user command is the conventional telephone-number command, then a lack of switched connection by the T.A.C. will merely generate an error, or reject, message back to the utility user's computer system for that respective telephone number.

As explained, supra, it is the objective of the present invention to also completely obviate the need for the utility user's computer-system's existence at all, with the only necessity being that the presently-existing mainframe computer system of the utility send the service-address commands and information to the N.A.C. This, of course, means that under this embodiment, the utility company will no longer send telephone-number commands at all to the N.A.C.

Figure 4:
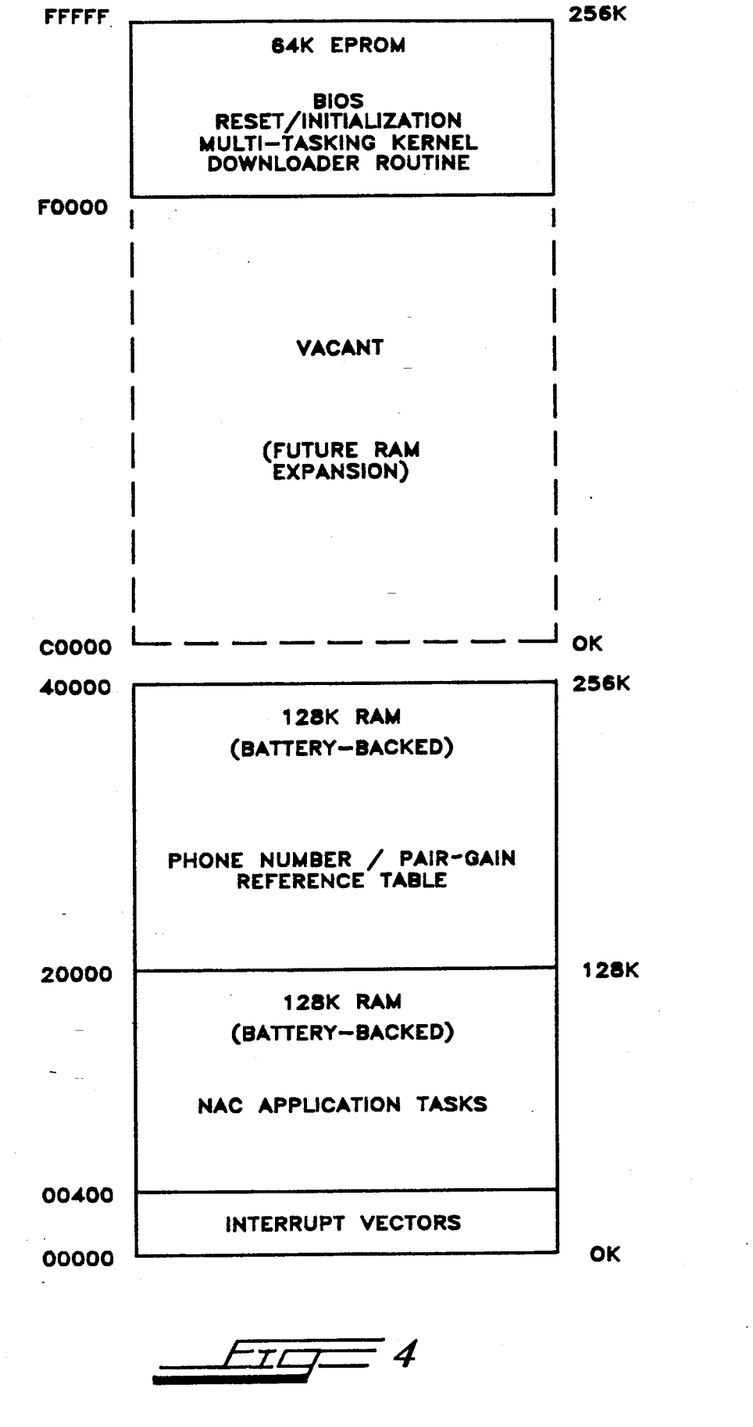
FIG. 4 is memory-map of the telephone-number administrator controller of the invention.

FIG. 4 is a memory-map of the number-administrator controller. 256K of nonvolatile random-access memory, or RAM, is used for application tasks. Until 00400H, the interrupt vectors are stored, with the remaining first 128K thereof being used for storing the application tasks discussed above in detail. The second 128K of the nonvolatile random-access memory—from address-locations 20000H to 40000H—are used for storing the telephone-number/service-address generated after the first complete cycle of automatic meter-reading of all of the M.I.U.'s of the utility. This reference-table also includes the "pair-gain" information, discussed supra, which information is needed by the trunk-access controller when switching to a subscriber-line center. This "pair-gain" information may either be obtained from the one of a plurality of telephone-company data bases accessed and used during the look-up routine, or, if the "Directory-Assistance Service" data base is used, such "pair-gain" information will be generated the first time the respective M.I.U. is being accessed, as explained, with a "pair-gain"-flag being generated if the attempt without such flag has proven unsuccessful. The N.A.C. of the invention also has an erasable-programmable read-only memory, or EPROM, for storing the codes of: BIOS, reset/initialization, multi-tasking kernel to execure tasks 1, 2 and 3 of FIG. 3., as well as a downloader routine, for remotely program ming the N.A.C. with new routines. The above-mentioned codes occupy 64K, from address-locations F000H to FFFFFH. Nonvolatile RAM from C0000 to F0000 is free for future expansion.

Figure 5:
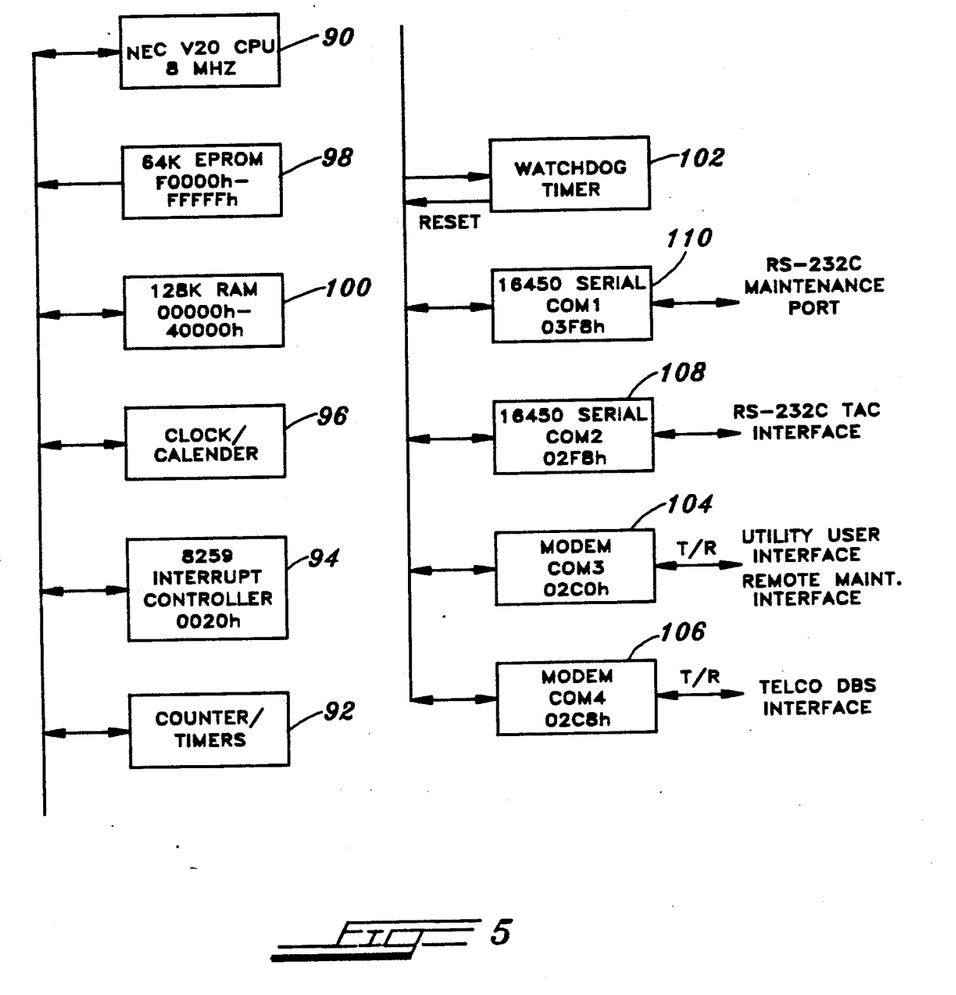
FIG. 5 is a block diagram of the hardware components of the system of the invention.

FIG. 5 shows the hardware diagram of the number-administrator controller, and includes a microprocessor 90, such as the ZT 8808/8809 microprocessor manufactured by Ziatech, Corp., of San Luis Obispo, Calif., which incorporates a NEC V20 CPU. Provided with this microprocessor are: 16-bit counter/timers 92, interrupt-controller 94, and real-time clock 96, in the conventional manner. 64K EPROM 98 and 256K nonvolatile RAM 100, discussed above with regards to the memory-map of FIG. 4, are also shown. A separate "watchdog" timer 102 provides a fail-safe mechanism to assure the ongoing proper operation of the CPU 90. The timer 102, if allowed to count down will force a reset of the CPU 90, and cause the N.A.C. control program to re-initialize. This assures that the N.A.C. will continue to operate even if errant operation is caused by some transient condition. Also provided are modem-interfaces 104, 106, such as that manufactured by Ziatech Corp., having a rate up to 2400 BAUD. The modem 104 communicates with the utility's user's system, for receiving commands and messages, and for sending data thereto, and, also, is used for remote-maintenance commands to the N.A.C. via the downloader-routine stored on EPROM 98, and discussed above with regards to the memory-map of FIG. 4. The modem 106 communicates with the telephone company's data base for performing the reverse-lookup, above described. A first serial port 108 provides the fixed, wire-line connection between the N.A.C. and the trunk-access controller (T.A.C.), while a second serial port 110 provides fixed, wire-line connection to other maintenance tasks. Also shown in FIG. 5 are the hexadecimal interrupt-vectors for the serial ports and the modem-interfaces.

The following is a description of an address, or location, command sent by the utility user's computer system, which address-command is represented by [L]:

| MSG POS. | ASCII CHARACTERS | DESCRIPTION | |
|---|---|---|---|
| MIU LOCATION COMMAND [L] | | | |
| 1 | STX | Start-Of-Text Character = 02 decimal | |
| 2-3 | 57 | MIU Location Command Message Length, always 57 characters | |
| 4 | L | Command Letter, "L" for MIU Access by MIU physical address | |
| 5-16 | 12 alpha | Locality Name | Unused fields |
| 17-24 | 8 alphanum | Street Number | are filled |
| 25-26 | 2 alpha | Street Direction | with ASCII |
| 27-50 | 24 alpha | Street Name | spaces |
| 51-53 | 3 alpha | Street Extension | (32 decimal) |
| 54-56 | 3 alpha | Unit Type | |
| 57-60 | 4 alphanum | Unit Identifier | |
| 61-64 | 4 digits | MIU Location Command Message CRC Code | |
| 65 | ETX | End-Of-Text Character = 03 decimal | |
| MIU LOCATION COMMAND ACKNOWLEDGMENTS | | | |
| 1 | NAK | Negative Acknowledgment = 21 decimal | |
| 1 | ACK | Affirmative Acknowledge = 06 decimal | |
| | | ERROR STATUS | |
| 2 | M | Multiple Telephone Numbers Identified | |
| 3 | ENQ | ASCII "ENQ" Control Code = 05 decimal | |

The other commands-messages sent by the utility user are conventional, as set forth in the publication entitled "Ameritech Automatic Meter Reading Services Interface Specifications", published by Ameritech Services, Inc., of Arlington Heights, Ill.

Within an AMR system which includes the telephone number administration control feature, the MIU location command [L] may be issued by the utility user as an alternative to the conventional MIU access command [T]. This new [L] command allows the utility user to request access to an MIU by the physical address (locality name, street address, apartment number, etc.) or the MIU, rather than by the subscriber telephone number as required by the standard MIU access command [T]. When the number administration controller (NAC) receives an MIU location command from the utility user, the NAC converts the physical address of the MIU specified by the command to the current subscriber-telephone number or numbers assigned to and operational at that address. If the conversion-process yields one and only one assigned telephone number, the NAC will forward this number to the associated TAC within a standard MIU access command. The MIU access process will proceed normally from this point, with the TAC attempting to access and alert the MIU in the usual manner. All access-responses received from the TAC are then forwarded to the utility user. Should the "address to telephone number conversion-process" yield multiple telephone numbers, either an error response indicating this condition is returned to the utility user, or the NAC automatically resolves the conflict by attempting to access an MIU at all identified numbers. To limit the number of telephone numbers identified for a given location, the utility user includes detailed address-information in the MIU location command. For example, a simple street address may not be sufficient to identify one, and only one, assigned telephone number; an apartment, suite, or unit designator may also be required.

An important feature of the telephone number administration system of the invention is that the telephone number or numbers which are identified for the MIU physical location, are never returned to the utility user. The subscriber-telephone number is used by the number administration system of the invention to complete the MIU access process, and only the MIU data-message is returned to the utility user. The utility user never receives any subscriber-telephone numbers from the number administration system of the invention.

While the above-description has concentrated on automatic meter-reading, the system of the invention also has wider application. The system of the invention has use in telemarketing, where sales-organizations would request telephone-listings for specific addresses in targeted neighborhoods, non-published numbers being eliminated. In addition, the system may be used in credit-checking, where small businesses could verify the correctness of a telephone number, i.e. after the customer supplied the number on the back of a credit application, check or invoice. The proprietor would call the N.A.C. of the invention, and input the address and telephone number; if correct, a proper signal would be returned.

While a specific embodiment of the invention has been shown and described, it is to be understood that numerous changes and modifications may be made therein without departing from the scope, spirit and intent of the invention as set forth in the appended claims.

What we claim is:

1. A system for the automatic meter-reading of customer-premise equipment comprising:

a utility user's computer system;

switch-controller means of a telephone company for achieving switched connection to the customer-premise equipment for actuating the customer-premise equipment for taking the reading of at least one meter at the customer-site; and number-across controller means in operative communication between said utility user's system and said switch-controller means for intermediating between said utility user's system and said switch-controller means;

said utility user's system comprising means for generating and sending customer-address message commands to said number-access controller means;

said number-access controller means comprising first means for receiving said message-commands;

a telephone-company data base comprising correlated data of telephone-number/customer-address for each telephone line serviced thereby;

said number-access controller means also being in operative communication with telephone-company data base, and further comprising second means for extracting a respective telephone number from said telephone-company data base corresponding to a customer-address represented by said utility user's system's message-command;

said number-access controller means comprising third means for transmitting said respective telephone-number to said switch-controller means, whereby said switch-controller means may thereby perform the necessary switching operations for coupling said number-access controller means to the respective customer-premise equipment for actuating said equipment to obtain a reading of a meter thereat;

said number-access controller means further comprising fourth means for storing in memory all of the telephone-number-customer-address pairs of the customer-sites of said utility user, after having looked up each said telephone-number one time from said telephone-company data base.

2. The system according to claim 1, wherein said number-access controller means comprises fifth means for sending the reading transmitted through said switch-controller means to said utility user's system.

3. The system according to claim 1, wherein said first means comprises a modem-interface, and said third means comprises a hard-wire, fixed coupling means.

4. The system according to claim 1, wherein said number-access controller means comprises memory means for storing therein software programs for performing three tasks, a first said task controlling the communications between said number-access controller means and said utility user's system, a second said task controlling the communications between said number-access controller means and said telephone-company data base, and a third said task controlling the communications between said number-access controller means and said switch-controller means; said memory means comprising a first portion thereof for storing a first program for said first task, a second portion for storing a second program for said second task, and a third portion for storing a third program for said third task.

5. The system according to claim 4, wherein said first program of said first memory portion comprises first means for determining if the message-command from said utility user's system is a customer-address command, and second means for routing said message-command to one of said second and third programs depending upon if the command from said utility user's system is a customer-address command.

* * * * *